United States Patent
Lambert et al.

(10) Patent No.: US 7,604,383 B2
(45) Date of Patent: Oct. 20, 2009

(54) RECONFIGURABLE HEADLAMP AND A CONTROL SYSTEM FOR RECONFIGURING A VEHICLE LIGHTING SYSTEM

(75) Inventors: Chad D. Lambert, Belleville (CA); Chris Wilson, Belleville (CA); Ronald Owen Woodward, Yorktown, VA (US)

(73) Assignee: Magna International (CA)

(*) Notice: Subject to any disclaimer, the term of this patent is extended or adjusted under 35 U.S.C. 154(b) by 53 days.

(21) Appl. No.: 11/477,768

(22) Filed: Jun. 29, 2006

(65) Prior Publication Data
US 2008/0002420 A1    Jan. 3, 2008

(51) Int. Cl.
F21V 9/00    (2006.01)
F21V 17/02    (2006.01)
F21V 11/00    (2006.01)
F21V 19/02    (2006.01)
F21V 21/14    (2006.01)

(52) U.S. Cl. .................. 362/511; 362/508; 362/512; 362/523; 362/529; 362/530

(58) Field of Classification Search .......... 362/545, 362/508, 511–515, 523–537
See application file for complete search history.

(56) References Cited

U.S. PATENT DOCUMENTS

| | | | | |
|---|---|---|---|---|
| 5,575,551 | A * | 11/1996 | Horii | 362/554 |
| 6,192,176 | B1 * | 2/2001 | Cassarly et al. | 385/32 |
| 6,260,991 | B1 * | 7/2001 | Hulse | 362/511 |
| 6,283,623 | B1 * | 9/2001 | Chinniah et al. | 362/511 |
| 6,558,031 | B2 * | 5/2003 | Tiesler-Wittig | 362/511 |
| 7,070,311 | B2 * | 7/2006 | Lee | 362/545 |
| 7,195,383 | B2 * | 3/2007 | Gebauer | 362/511 |
| 2002/0080617 | A1 * | 6/2002 | Niwa et al. | 362/465 |
| 2004/0027834 | A1 * | 2/2004 | Chigusa et al. | 362/511 |
| 2004/0114379 | A1 * | 6/2004 | Miller et al. | 362/464 |
| 2004/0240217 | A1 * | 12/2004 | Rice | 362/465 |
| 2004/0246739 | A1 * | 12/2004 | Gebauer | 362/538 |
| 2005/0275562 | A1 | 12/2005 | Watanabe | |
| 2006/0133104 | A1 * | 6/2006 | Okubo et al. | 362/545 |

FOREIGN PATENT DOCUMENTS

| | | |
|---|---|---|
| DE | 100 11 843 | 9/2001 |
| DE | 20 2004 009 121 U1 | 2/2004 |
| DE | 10 2004 032 886 A1 | 7/2004 |
| EP | 0 932 023 | 7/1999 |

(Continued)

Primary Examiner—Jong-Suk (James) Lee
Assistant Examiner—David J Makiya
(74) Attorney, Agent, or Firm—Warn Partners, P.C.; Marc Luddy

(57) ABSTRACT

A headlamp fixture and a control system for controlling a vehicular lighting system to produce particular lighting patterns required under different regulatory regimes is disclosed. The headlamps employ semiconductor light sources to create the desired patterns and can include at least two inclined light source elements which are alternately illuminated to produce required side illumination or can include single light source elements which can be rotated clockwise and counterclockwise to produce the required side illumination. The lighting system can employ an output from a GPS receiver to determine the country or region in which the vehicle is being driven to automatically configure the operation of lighting system components, such as the side illumination of the headlamps and/or the activation and deactivation of daytime running lights, to meet the regulatory requirements of the country or region.

18 Claims, 4 Drawing Sheets

FOREIGN PATENT DOCUMENTS

| | | |
|---|---|---|
| EP | 1 213 178 | 6/2002 |
| EP | 1 388 461 | 2/2004 |
| EP | 1 748 251 | 1/2007 |
| WO | WO 2006/102882 | 10/2006 |
| WO | WO 2007/062277 | 5/2007 |

* cited by examiner

RECONFIGURABLE HEADLAMP AND A CONTROL SYSTEM FOR RECONFIGURING A VEHICLE LIGHTING SYSTEM

FIELD OF THE INVENTION

The present invention relates to a vehicular headlamp fixture and a control system for a vehicle lighting system. More specifically, the present invention relates to a vehicular headlamp fixture which is reconfigurable to meet different regulatory requirements as the vehicle is moved between areas with such different requirements and the control system for reconfiguring such a headlamp and other vehicle lighting system components.

BACKGROUND OF THE INVENTION

Vehicle lighting systems, and in particular headlamp systems, are subject to a variety of regulatory requirements which define permitted beam patterns, illumination levels, etc. While designing lighting systems which meet these requirements can be challenging, the problem is further exacerbated when the designed system will be used in two or more jurisdictions with different regulations and must meet different regulatory requirements. Further, in some cases the lighting system must meet different requirements even when only used in a single regulatory jurisdiction. For example, some ECE regulations depend upon whether the vehicle is operated in a Right Hand Drive (RHD) country or a Left Hand Drive (LHD) country and vehicles sold within the member countries of the European Community must be able to meet their local requirements without offending the requirements of the other jurisdictions.

To deal with the issue of a LHD car operating in a RHD country (or vice versa), it is known to provide a "Tourist Mode" switch for the vehicle's lighting systems. When a vehicle from a RHD country visits a LHD country, the driver will activate the switch which will then result in a shield being deployed within the headlamp to block inappropriate lighting which would otherwise blind approaching drivers, etc. While the vehicle lighting system typically does not meet the regulatory requirements when operating in Tourist mode, the resulting lighting patterns are less offensive than the unaltered patterns and this type of operation is generally tolerated. In particular, the Vienna Convention On Road Traffic 1968 permits this type of operation.

While such Tourist Mode systems can deal with different regulatory requirements in a permitted manner, they do suffer from disadvantages, including the fact that the switch must be manually operated by the driver, and is thus subject to being activated at inappropriate times (i.e.—while still in the home regulatory environment), failing to be activated when appropriate (i.e.—failing to activate Tourist Mode when visiting a LHD country from a RHD country, etc.) and results in an increased manufacturing expense for the lighting system and/or additional difficulty in creating a regulatory compliant lighting system design

SUMMARY OF THE INVENTION

It is an object of the present invention to provide a novel headlamp and a control system for a vehicle lighting system which obviates or mitigates at least one disadvantage of the prior art.

According to a first aspect of the present invention, there is provided a headlamp fixture for creating at least a high beam illumination pattern and a low beam illumination pattern and a side illumination pattern in accordance with a set of regulatory requirements which change by country or region, comprising: a plurality of light source elements, each including a semiconductor light source and a pattern optic, light from the semiconductor light source being conveyed to the pattern optic via a light pipe, the pattern optic being designed to substantially vertically constrain the light emitted from the light source element and to substantially horizontally spread the light emitted from the light source element, the light emitted from the light source elements creating the desired high beam and low beam patterns; and at least one light source element whose pattern optic is inclined with respect to a horizontal axis of the headlamp to create the desired side illumination pattern.

Preferably, when only a single light source element is provided, the at least one light source element is moveable between first and second opposed inclinations to alternately provide the required side illumination pattern during RHD and LHD operation of the vehicle in which the headlamp is installed. Preferably, when two light source elements are provided, the two light source elements are oppositely inclined with respect to the horizontal axis of the headlamp, the two light source elements being alternately illuminated to provide the desired side illumination pattern when the vehicle is in a RHD or LHD country or jurisdiction.

According to another aspect of the present invention, there is provided a control system for operating a vehicle illumination system to comply with regulatory requirements which change between jurisdictions or countries, the system comprising: at least one headlamp fixture, each headlamp fixture capable of providing a high beam illumination pattern and a low beam illumination pattern; at least one other light fixture; a GPS receiver operable to determine the country or region in which the vehicle is being operated in; and a controller, responsive to a signal received from the GPS receiver to alter the operation of at least one of the at least one headlamp and the at least one other fixture to comply with the regulatory requirements in the determined country or region.

The present invention provides a headlamp system and a system for controlling a headlamp system and/or other aspects of a vehicular lighting system to produce particular lighting patterns required under different regulatory regimes is disclosed. The headlamps employ semiconductor light sources to create the desired patterns and can include at least two inclined light source elements which are alternately illuminated to produce required side illumination or can include single light source elements which can be rotated clockwise and counterclockwise to produce the required side illumination. The lighting system can employ an output from a GPS receiver to determine the country or region in which the vehicle is being driven to automatically configure the operation of lighting system components, such as the side illumination of the headlamps, to meet the regulatory requirements of the country or region.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
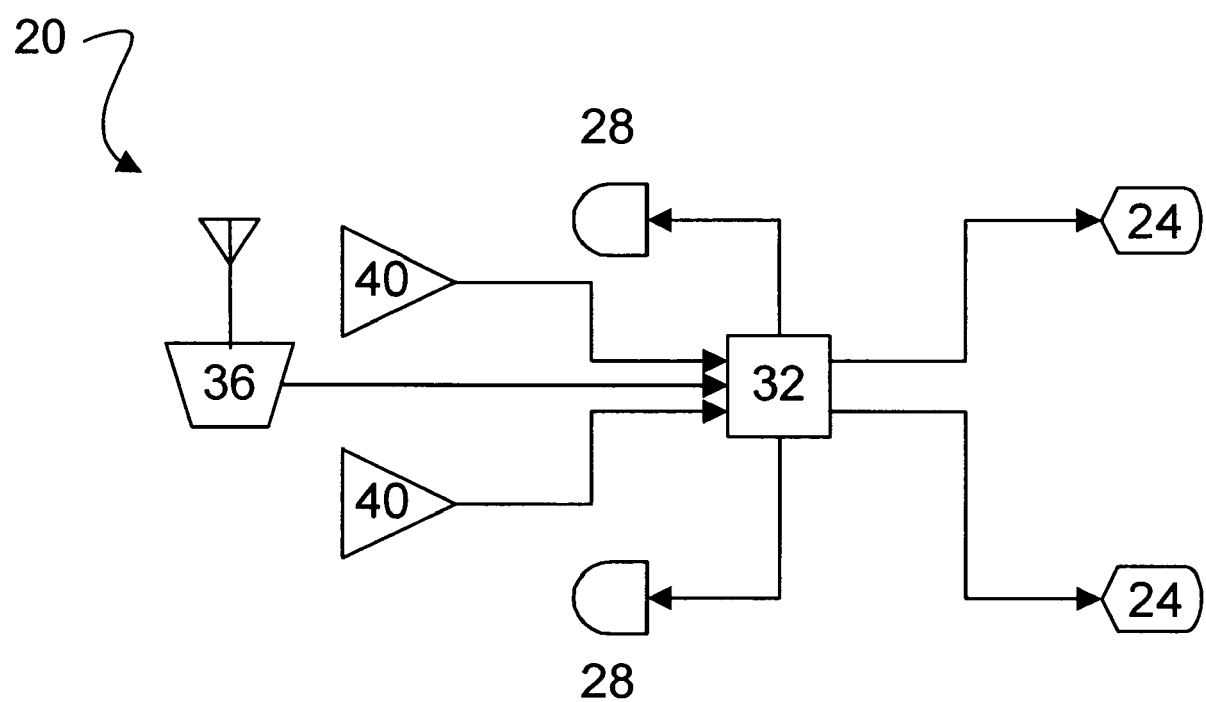
FIG. 1 shows a schematic representation of a system for reconfiguring a lighting system of a vehicle in accordance with the present invention.

As mentioned above, regulatory requirements for vehicular lighting systems can change from one country and/or region to another and/or a regulation can require different operations of the vehicle lighting system under different conditions. One example of such a regulation is ECE Regulation No. 112 entitled, "Uniform Provisions Concerning The Approval of Motor Vehicle Headlamps Emitting An Asymmetrical Passing Beam Or Driving Beam Or Both And Equipped With Filament Lamps". Annex 3 of this regulation specifies a fifteen degree side illumination spread light ("side illumination pattern") to illuminate sidewalks and/or road signs adjacent the vehicle. In particular, each headlamp is required to provide a spread light side lighting pattern which is raised at a fifteen degree angle from a horizontal axis through the vehicle to illuminate the roadside adjacent the vehicle.

As will be apparent, the headlamps of a vehicle driven in a RHD country, such as the United Kingdom, must produce this side illumination pattern rising from the center of the vehicle towards the left hand side, while the headlamps of a vehicle driven in a LHD country, such as France, must produce this side illumination pattern rising from the center of the vehicle towards the right hand side.

A RHD country vehicle operating in a LHD country will be producing a side illumination pattern which could blind approaching drivers and which does not illuminate the sidewalk and/or road signs as required and the same is true for a LHD vehicle operating in a RHD country. Accordingly, it is known to provide a switch to allow the driver to alter the beam pattern produced by his vehicle to be less problematic outside the home region or country of the vehicle. Typically, this switch will result in the side illumination pattern being blocked (for example, by a moveable shield within the headlamp) or extinguished (if provided by a separate light source).

The need for different beam patterns is not just limited to differences between RHD and LHD countries. For example, the above-mentioned side illumination pattern is not required in North America. Thus, a vehicle capable of complying with a range of regulatory requirements may require a Tourist Mode switch with three or more possible settings. Similarly, regulations defining permitted High Beam (driving) and Low Beam (city) beam patterns can be different in different countries, independent of whether they are RHD or LHD countries. For example, the required High Beam pattern in Japan is different than the required High Beam pattern in the United Kingdom, even though both countries are RHD countries.

While Tourist Mode switches and the like can allow vehicles to be less offensive in other jurisdictions and, in some cases, to comply with applicable lighting regulations when moving between different jurisdictions, they do require the driver of the vehicle to proactively, and correctly, operate the switch. Clearly, either activating the switch at an inappropriate time, or failing to activate the switch when required, will lead to undesired and/or non compliant lighting patterns being created.

FIG. 1 shows a vehicular lighting system 20 in accordance with one aspect of the present invention. Lighting system 20 includes at least a pair of headlamp fixtures 24 and can include one or more other light fixtures 28, such as fog lamps, driving lamps, daytime running lights, side lamps, etc.

Lighting system 20 further includes a controller 32, which can be one or more relays or electronic switches, or which can be a microprocessor based. Controller 32 accepts, as one of its inputs, an input from a GPS receiver 36 and inputs from one or more switches 40, such as a headlamp power switch and/or a High Beam/Low Beam selector switch.

GPS receiver 36 provides data to controller 32 to identify the country, or region, in which the vehicle in which lighting system 20 is installed in, is presently operating. While this data can merely comprise latitude and longitude data which controller 32 compares to reference data stored therein to determine the country or region it is operating in, preferably GPS receiver 36 is a GPS Navigation system which is intended for use to provide navigation assistance in an automotive environment. Such GPS navigation systems typically include geodesic and/or map information which allows the GPS navigation system to provide a direct indication to controller 32 to identify the country or region in which lighting system 20 is operating.

Controller 32 will include a stored set of at least two different operating configurations under which lighting system 20 can be operated to meet regulatory requirements in different countries or jurisdictions. For example, if controller 32 determines, from data provided from GPS receiver 36, that it is operating in Canada, controller 32 can activate daytime running lights (DRLs) which are required in Canada. Conversely, if controller 32 determines, from data provided from GPS receiver 36, that it is operating in the United States, controller 32 can deactivate the DRLs which are not required in the United States.

Similarly, if controller 32 determines, from data provided from GPS receiver 36, that it is operating in the United Kingdom, controller 32 can alter the operation of headlamps 24 to provide the side illumination pattern specified in the above-mentioned ECE Regulation No. 112 in a RHD pattern while, if controller 32 determines that it is operating in France, it can alter the operation of headlamps 24 to provide the required side illumination pattern in a LHD pattern.

As will be apparent to those of skill in the art, controller 32 is not limited to alteration of headlamp or daytime running light patterns and other lighting system functions or other vehicle systems can be varied as required. For example, turning signal flashing rates can be varied, if required, as can the color of indicator signals such as turn signals which may be required to be amber in some jurisdictions and red in others. In this latter case, it is contemplated that light fixtures 28 can contain different colored light sources which can be illuminated by controller 32 as appropriate. Other possible lighting fixtures whose operating characteristics can be changed include, without limitation, front position side lamps, front parking lamps, rear fog lamps, side repeater lamps and center high mounted stop lamps.

It should also be apparent to those of skill in the art that the present invention can be employed with a wide range of vehicles, including automobiles, trucks and motorcycles.

Also, the hotspots and/or other components of the high beam and/or low beam patterns produced by headlamps can vary between different countries and/or regions. Accordingly, controller 32 can alter the operation of one or more light source elements 40 in headlamp fixtures 24 to create beam patterns compliant with the regulations of the country or region in which the headlamp is being operated. Headlamp 24 can include light sources which are illuminated, or extinguished, or appropriately dimmed, by controller 32 to produce a compliant beam pattern.

As will also be apparent to those of skill in the art, while controller 32 is shown in FIG. 1 as a separate device from GPS receiver 36, it is contemplated that controller 32 can be an integral part of GPS Receiver 36.

While, as mentioned above, it is known to have headlamps whose operation can be altered to be less offensive to different regulated patterns in different countries, such known headlamps have employed incandescent or gas discharge light sources. More recently, headlamp systems have been proposed utilizing semiconductor light sources and, in particular, relatively high output white light emitting diodes (LEDs).

While headlamp fixtures employing such semiconductor light sources can provide advantages over conventional headlamp fixtures, to date such systems have not been reconfigurable to provide appropriate side illumination patterns.

Figure 2:
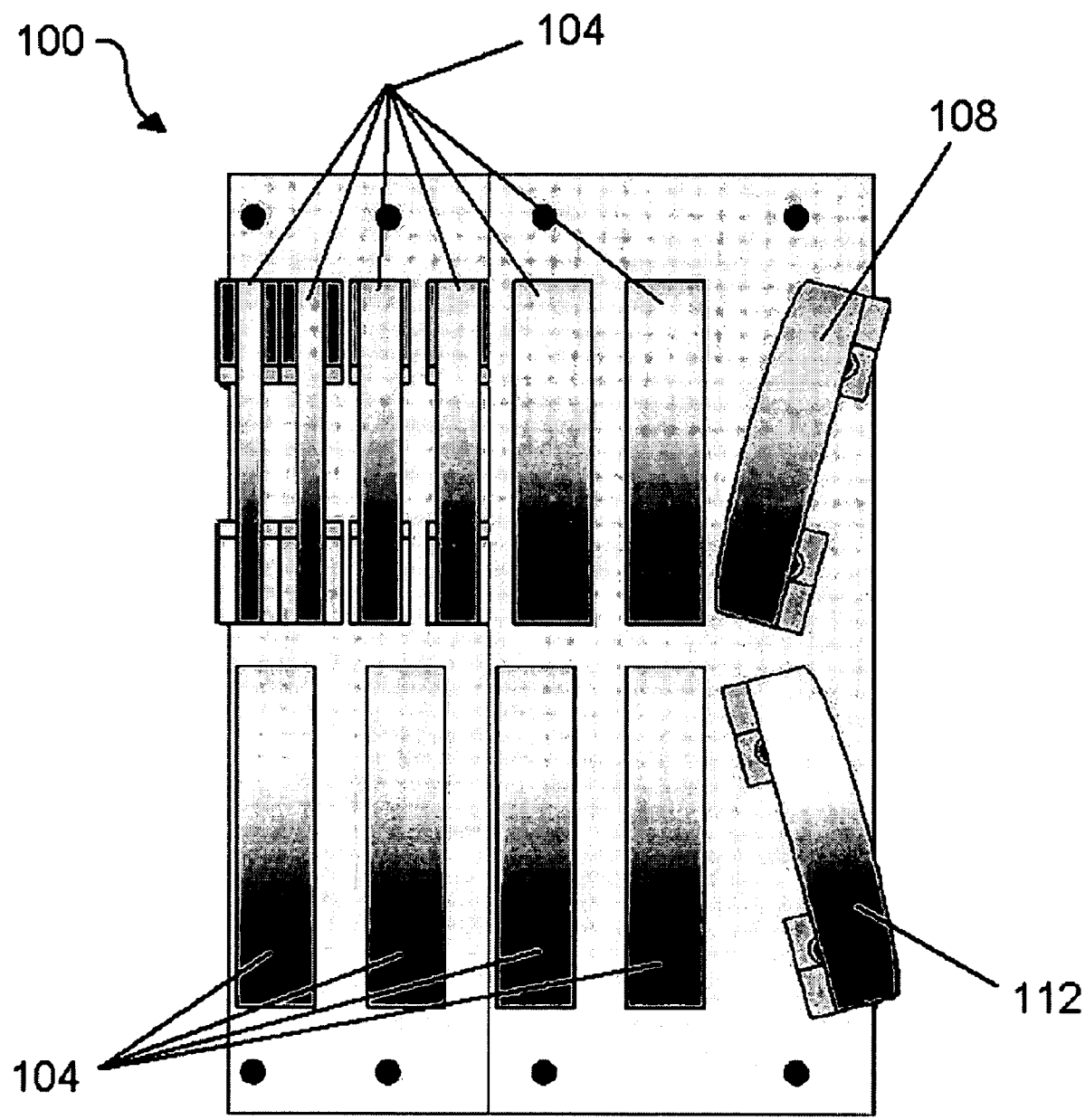
FIG. 2 shows a light source assembly in accordance with the present invention for use in constructing a vehicle headlamp fixture.

FIG. 2 shows a light source assembly 100 for use in constructing a headlamp fixture 24 in accordance with the present invention. Light source assembly 100 comprises a set of light source elements 104 and two inclined light source elements 108 and 112. Each of light source elements 104 provide illumination for a portion of a desired headlamp beam pattern. Headlamp fixture 24 will typically further comprise an enclosure (not shown), a power supply (not shown), other light sources (not shown) and other components as will occur to those of skill in the art.

Figure 3:
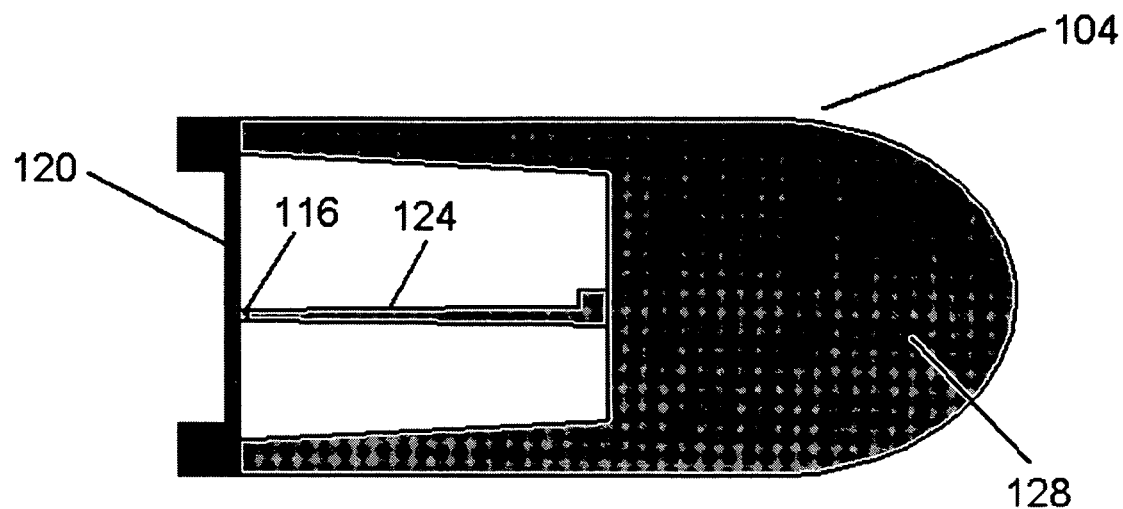
FIG. 3 shows a light source element for use in the light source assembly of FIG. 2.

FIG. 3 shows a representative example of light source elements 104. Light source elements 104 are similar to the modular light source assemblies described in U.S. patent application Ser. No. 11/393,023, entitled "SEMICONDUCTOR-BASED LIGHTING SYSTEM AND LIGHTING SYSTEM COMPONENTS FOR AUTOMOTIVE USE" filed on Mar. 30, 2006 to Christopher H. Wilson, et al.; and the contents of that application are incorporated by reference herein. As illustrated, in light source element 104 a semiconductor light source 116 is mounted to a mounting member 120. Semiconductor light source 116 can be a light emitting diode and mounting member 120 can be a planar member on which the necessary electrical conductors to power light source 116 can be mounted. Further, it is preferable that mounting member 120 act as a heat sink to assist in the removal of waste heat from semiconductor light source 116.

A light pipe 124 is located over the light emitting surface of light source 116 and directs substantially all of the light emitted by light source 116 into pattern optic 128 which forms the output light into the desired pattern. Pattern optic 128 and light pipe 124 can be integrally formed from a suitable material, such as acrylic, or can be formed from different materials, such as optical glass for light pipe 124 and acrylic for pattern optic 128, and joined appropriately.

Pattern optic 128 has generally parallel sides and is "D" shaped when viewed from the side. As will be apparent to those of skill in the art, this "D" shape results in the pattern of light emitted by light source assembly 104 being relatively constrained vertically and while being relatively spread horizontally. The use of light source elements 104 to construct a headlamp is described in detail in the above-mentioned U.S. patent application and will not be discussed in further detail herein.

In FIG. 2, the required low beam and high beam headlamp patterns are created by illuminating and/or extinguishing appropriate sets of light source elements 104. If it is desired to provide different low beam and/or high beam patterns for compliance with regulatory regimes in different countries or regions, additional light source elements 104 can be included in light source assembly 100 and/or light source elements 104 can be illuminated, extinguished or dimmed, as necessary.

The side illumination pattern, to comply with ECE Regulation No. 112, is created by illuminating or extinguishing inclined light source elements 108 and 112 which are positioned with their sides at a fifteen degree angle with respect to a horizontal axis.

Figure 4:
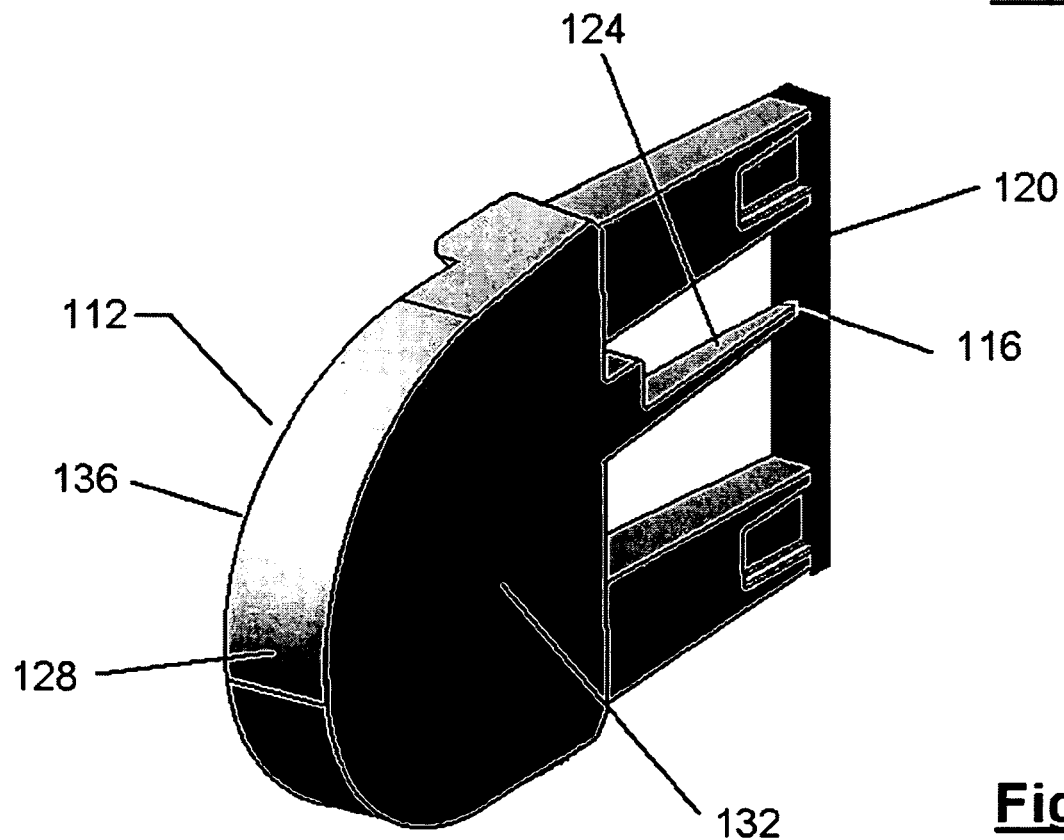
FIG. 4 shows an inclined light source element use in the light source assembly of FIG. 2.

While inclined light source elements 108 and 112 can be identical, apart from their orientation, to light source elements 104, in a preferred embodiment of the present invention inclined light source elements 108 and 112 have non parallel sides on pattern optic 128. FIG. 4 shows inclined light source element 112 and, as shown, side 132 diverges from side 136, thickening pattern optic 128 from the point where light pipe 124 contacts it. This thickening of the pattern optic 128 of inclined light source element 112 results in a slight increase in the spreading of the light from inclined light source 112 in the direction perpendicular to the plane of side 132. This increased spreading can assist in producing a desired pattern for the fifteen degree side illumination.

When light source assembly 100 is used to construct a left hand headlamp fixture, inclined light source element 112 is illuminated in a RHD country to produce the desired side illumination pattern, while inclined light source element 108 will be illuminated in a LHD country to produce the desired side illumination pattern.

Figure 5:
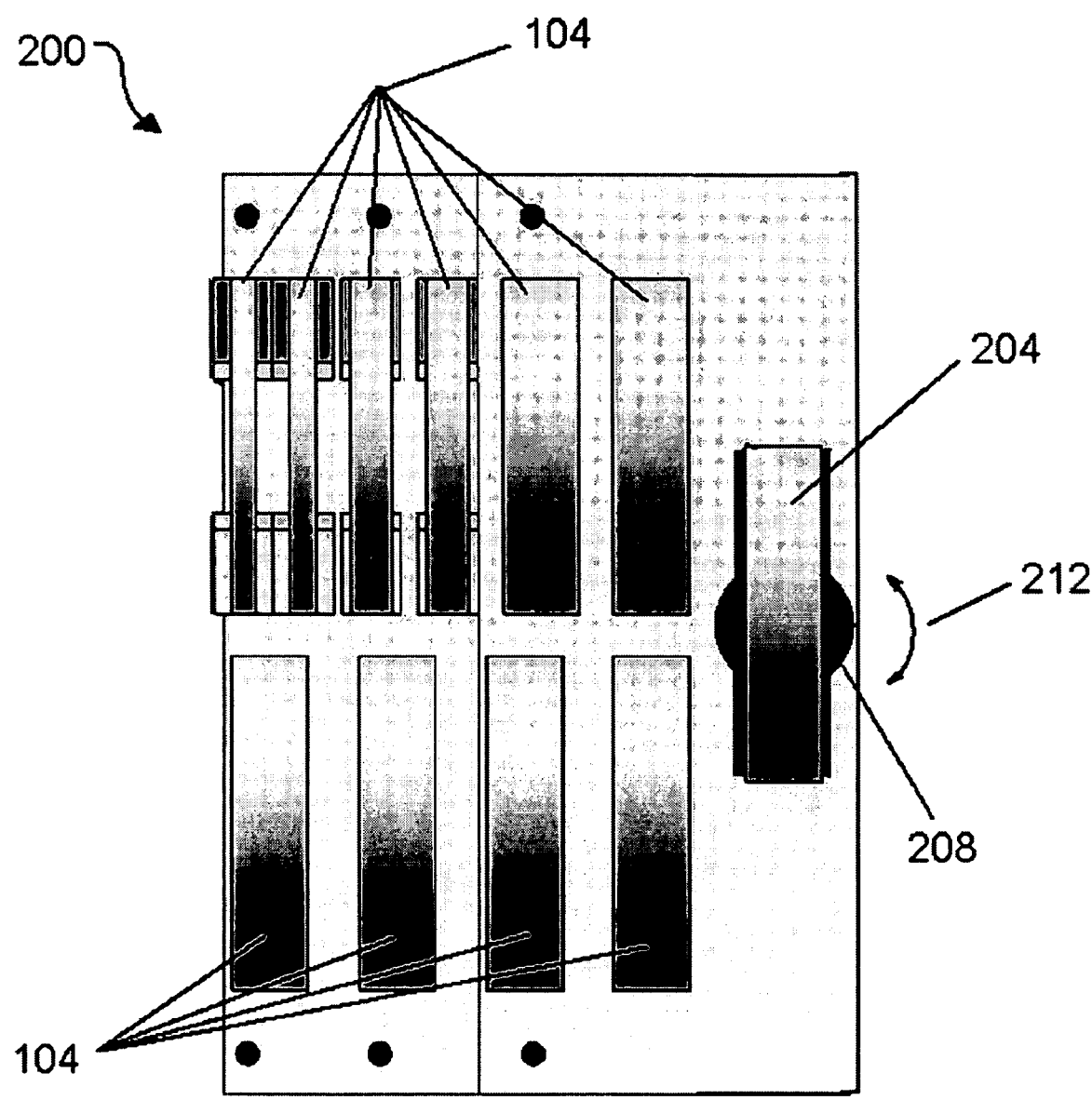
FIG. 5 shows another light source assembly in accordance with the present invention for use in constructing a vehicle headlamp.

FIG. 5 shows another embodiment of a light source assembly 200 in accordance with the present invention wherein like components to those of light source assembly 100 are indicated with like reference numerals. In this embodiment, only a single inclined light source element 204 is employed and inclined light source element 204 is mounted to a pivot mechanism 208 which allows inclined light source element 204 to be inclined, clockwise or counterclockwise as indicated by arrow 212, with respect to a horizontal access across light source assembly 200.

It is contemplated that pivot mechanism 208 can be any suitable mechanism for controllably rotating inclined light source element 204 and such mechanisms can include stepper motors, solenoid-driven turntables, etc.

When light source assembly 200 is used to construct a left hand headlamp, inclined light source element 204 is rotated counterclockwise, with respect to the illustrated orientation of assembly 200 illuminated in a RHD country to produce the desired side illumination pattern, and is rotated clockwise in a LHD country to produce the desired side illumination pattern. In countries wherein a side illumination pattern is not required, or is prohibited, inclined light source element 204 can be extinguished, or can be rotated to the position illustrated in FIG. 5 to produce light to be added to the beam pattern produced by light source elements 104.

As will be apparent to those of skill in the art, controller 32 can be used to illuminate inclined light source elements 108 and 112 as required, or to rotate and illuminate light source element 204 as required to automatically produce a side illumination pattern required in a particular country or region. However, as will also be apparent to those of skill in the art, the headlamps of the present invention are not limited to use with lighting systems including a controller 32 and can be used instead with otherwise conventional lighting systems, such as those with a Tourist Mode switch or equivalent.

The present invention provides a headlamp system and a system for controlling a headlamp system and/or other aspects of a vehicular lighting system to produce particular lighting patterns required under different regulatory regimes. The headlamps of the present invention employ semiconductor light sources to create the desired patterns and can include at least two inclined light source elements which are alternately illuminated to produce required side illumination or can include single light source elements which can be rotated clockwise and counterclockwise to produce the required side illumination. The lighting system can employ an output from a GPS receiver to determine the country or region in which the vehicle is being driven to automatically configure the operation of lighting system components, such as the side illumination of the headlamps, to meet the regulatory requirements of the country or region.

The above-described embodiments of the invention are intended to be examples of the present invention and alterations and modifications may be effected thereto, by those of skill in the art, without departing from the scope of the invention which is defined solely by the claims appended hereto.

We claim:

1. A headlamp fixture for creating at least a high beam illumination pattern and a low beam illumination pattern and a side illumination pattern comprising:
    a plurality of light source elements, each including a semiconductor light source and a pattern optic, light from the semiconductor light source being conveyed to the pattern optic via a light pipe, the pattern optic being designed to substantially vertically constrain the light emitted from the light source element and to substantially horizontally spread the light emitted from the light source element, the light emitted from the light source elements creating the desired high beam and low beam patterns;
    at least one light source element whose pattern optic is inclined with respect to a horizontal axis of the headlamp to create the desired side illumination pattern; and
    wherein the at least one light source element is moveable between first and second opposed inclinations providing the side illumination pattern during right side driving and left side driving operation of the vehicle in which the headlamp fixture is installed, wherein the at least one light source element is moved to the right side driving or left side driving operation in response to a signal from a global positioning system receiver in the vehicle, the signal indicating the country or region in which the vehicle is being operated.

2. The headlamp fixture of claim 1, wherein the at least one light source element is moved by a stepper motor.

3. The headlamp fixture of claim 1, wherein the at least one light source element is moved by a solenoid.

4. The headlamp fixture of claim 1, wherein the at least one light source element is moved in response to the operation of a switch by the driver of the vehicle.

5. The headlamp fixture of claim 1 including two light source elements which are oppositely inclined with respect to the horizontal axis of the headlamp, the two light source elements being alternately illuminated to provide the desired side illumination pattern when the vehicle is in a right side driving or left side driving country or jurisdiction.

6. The headlamp fixture of claim 5 wherein the illumination of one of the two light source elements is in response to the operation of a switch by the driver of the vehicle.

7. The headlamp fixture of claim 5 wherein the illumination of one of the two light source elements is in response to a signal from a global positioning system receiver in the vehicle, the signal indicating the country or region in which the vehicle is being operated.

8. A control system for operating a vehicle illumination system to comprising:
    at least one headlamp fixture having a plurality of tight source elements, each including a semiconductor light source and a pattern optic, light from the semiconductor light source being conveyed to the pattern optic via a light pipe, the pattern optic being designed to substantially vertically constrain the light emitted from the light source element and to substantially horizontally spread the light emitted from the light source element, the light emitted from the light source elements creating the desired high beam and low beam patterns, each headlamp fixture capable of providing a high beam illumination pattern and a low beam illumination pattern;
    at least one other light fixture;
    a global positioning system receiver operable to determine the country or region in which the vehicle is being operated in;
    a controller, responsive to a signal received from the global positioning system receiver to alter the operation of at least one of the at least one headlamp fixture and the at least one other light fixture to a right side driving or left side driving position as by determined country or region that the control system is located; and
    wherein the at least one light source element is moveable by the controller between first and second opposed inclinations providing the side illumination pattern during right side driving and left side driving operation of the vehicle in which the headlamp fixture is installed.

9. The control system of claim 8 wherein the high beam pattern produced by the headlamp fixture is changed by the controller.

10. The control system of claim 8 wherein the low beam pattern produced by the headlamp fixture is changed by the controller.

11. The control system of claim 8 wherein a side illumination pattern produced by the headlamp fixture is changed by the controller.

12. The control system of claim 8 wherein the at least one other fixture is a daytime running light and the illumination of the daytime running light is changed by the controller.

13. The control system of claim 8 wherein the at least one other fixture is a signal light having at least two light sources of different color and the selection of which light source to employ is changed by the controller.

14. The control system of claim 8 wherein the at least one other fixture is a front position side lamp.

15. The control system of claim 8 wherein the at least one other fixture is a front parking lamp.

16. The control system of claim 8 wherein the at least one other fixture is a rear fog lamp.

17. The control system of claim 8 wherein the at least one other fixture is a side repeater lamp.

18. The control system of claim 8 wherein the at least one other fixture is a center high mounted stop lamp.

* * * * *